United States Patent
Fulkerson et al.

(10) Patent No.: US 7,466,507 B2
(45) Date of Patent: Dec. 16, 2008

(54) RANGELESS SERVO NOTCH OPTIMIZATION

(75) Inventors: Christopher Ryan Fulkerson, Mustang, OK (US); Jeffrey Don Andress, Edmond, OK (US); Charles Randall Berry, Hiaton, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 1277 days.

(21) Appl. No.: 10/179,742

(22) Filed: Jun. 24, 2002

(65) Prior Publication Data

US 2003/0133212 A1    Jul. 17, 2003

Related U.S. Application Data

(60) Provisional application No. 60/347,593, filed on Jan. 11, 2002.

(51) Int. Cl.
  *G11B 27/36*    (2006.01)
  *G11B 5/035*    (2006.01)
  *G11B 5/596*    (2006.01)
(52) U.S. Cl. .................. 360/65; 380/31; 380/78.09
(58) Field of Classification Search .................. 360/31, 360/25, 75, 46, 67, 65, 77.04, 77.02, 78.09, 360/78.04; 318/560, 561; 324/210, 212, 324/226
  See application file for complete search history.

(56) References Cited

U.S. PATENT DOCUMENTS

| | | | |
|---|---|---|---|
| 5,325,247 A | 6/1994 | Ehrlich et al. | |
| 5,638,230 A | 6/1997 | Kadlec | |
| 6,219,196 B1* | 4/2001 | Semba et al. | 360/75 |
| 6,246,536 B1 | 6/2001 | Galloway | |
| 6,377,418 B1 | 4/2002 | Kagami et al. | |
| 6,417,982 B1* | 7/2002 | Ottesen et al. | 360/77.02 |
| 6,741,914 B1* | 5/2004 | Tze Ming Pang | 700/276 |
| 2003/0048569 A1* | 3/2003 | Galloway et al. | 360/78.04 |

OTHER PUBLICATIONS

U.S. Appl. No. 10/056,337, Galloway et al., filed Jan. 24, 2002.

* cited by examiner

*Primary Examiner*—Joseph H Feild
*Assistant Examiner*—Daniell L Negrón
(74) *Attorney, Agent, or Firm*—Shumaker & Sieffert, P.A.

(57) ABSTRACT

A method for placing a predetermined number of notch filters in a disc drive servo control system to attenuate noise frequencies, in order of decreasing resonance magnitudes, is disclosed. The method involves calculating an open loop response for a response spectrum of the drive, calculating a notch filter for any noise frequency that exceeds a threshold, mathematically applying the notch filter into the servo control system, recalculating the open loop response and applying another filter for a noise frequency that exceeds the threshold and repeating until no noise frequencies exceed the gain threshold; selecting another frequency range and repeating the same process until a predetermined number of notch filters has been placed in the servo control system.

20 Claims, 4 Drawing Sheets

RANGELESS SERVO NOTCH OPTIMIZATION

RELATED APPLICATIONS

This application claims priority of U.S. provisional application Ser. No. 60/347,593, filed Jan. 11, 2002.

FIELD OF THE INVENTION

This application relates generally to data storage device servo control systems and more particularly to a method for optimizing notch filter placement in a servo control system such as is typically used in a disc drive to control positioning of a transducer over a rotating storage medium.

BACKGROUND OF THE INVENTION

Notch filters are placed in the track following and seeking control loops in conventional servo control systems to help stabilize the actuator mechanics. These notch filters are typically mathematically implemented in algorithms defined in the drive control firmware. The particular placement parameters utilized in these notch filter algorithms may be stored in the boot record on the disc or permanently stored in the firmware. To compensate for drive-to-drive variations, notch filter placement is customized for each drive and each head within a drive. Since each head in every drive requires its own set of specific notch filters, notch filter placement is accomplished as part of a manufacturing test process that customizes, tunes, and validates every drive.

Servo Notch Optimization (SNO) is the portion of the post assembly manufacturing test process that places the notch filters. Due to memory limitations, the factory test systems that perform this portion cannot acquire the necessary number of data points to optimize the entire frequency range of interest in disc drive operation. Thus, the current SNO requires that the frequency spectrum of each head be divided into a series of smaller ranges. The SNO process then places only one notch per sub-range. Ideally, each sub-range will only contain one resonance peak that needs to be notched since the current SNO process only allows one notch per range.

The current conventional SNO process has several shortcomings. First, it requires prior identification of the resonances that will require notch filters. Second, it requires that the center frequency of the previously identified resonances be consistent from drive to drive. Third, as previously mentioned, the SNO process only allows for one notch per range. The current conventional SNO process is inadequate, due to drive-to-drive frequency variations and the one notch per sub-range limitation, in the case of double peaked resonances that require two notches for appropriate coverage. Accordingly there is a need for a more versatile method for notch filter placement in a disc drive control scheme. The present invention provides a solution to this and other problems, and offers other advantages over the prior art.

SUMMARY OF THE INVENTION

Against this backdrop the present invention has been developed. The rangeless SNO method in accordance with the present invention essentially works by creating a circular memory buffer within the SNO process. The buffer length is preferably equal to the allotted memory in the factory test system. At each frequency point contained in the memory buffer, the SNO algorithm measures the structural and compensator responses of the drive, mathematically computes the open loop response, and compares the output to a gain threshold. If the open loop response exceeds the gain threshold, a peak detect algorithm finds the resonance peak, determines the required filter parameters for this peak, and places a notch filter centered on the resonance. Once placed, the notches are mathematically applied to all frequency points in the memory buffer and the open loop response is re-calculated. The re-calculated open loop response (with the first iteration notches incorporated) is then again compared to the same gain threshold and notches are placed until every point in the buffer is below the gain threshold. Once all points in the buffer pass below the threshold, the frequency range of the buffer is shifted to a new frequency range and the process is repeated. Once the entire frequency range of the drive has been tested, the gain threshold is lowered and the entire process is repeated. Basically this iterative process continues until all available notches are placed. The result is that notches are placed in order from the largest resonance peaks to the smallest resonance peaks for the available notch filters. In this manner, the available filters are always optimally placed.

These and various other features as well as advantages which characterize the present invention will be apparent from a reading of the following detailed description and a review of the associated drawings.

DETAILED DESCRIPTION

Figure 1:
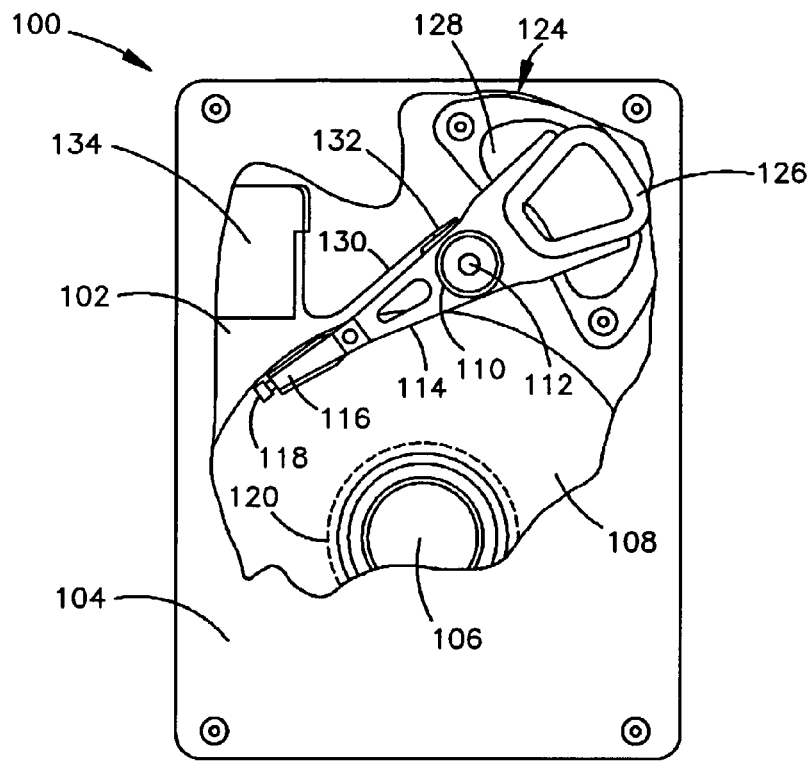
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
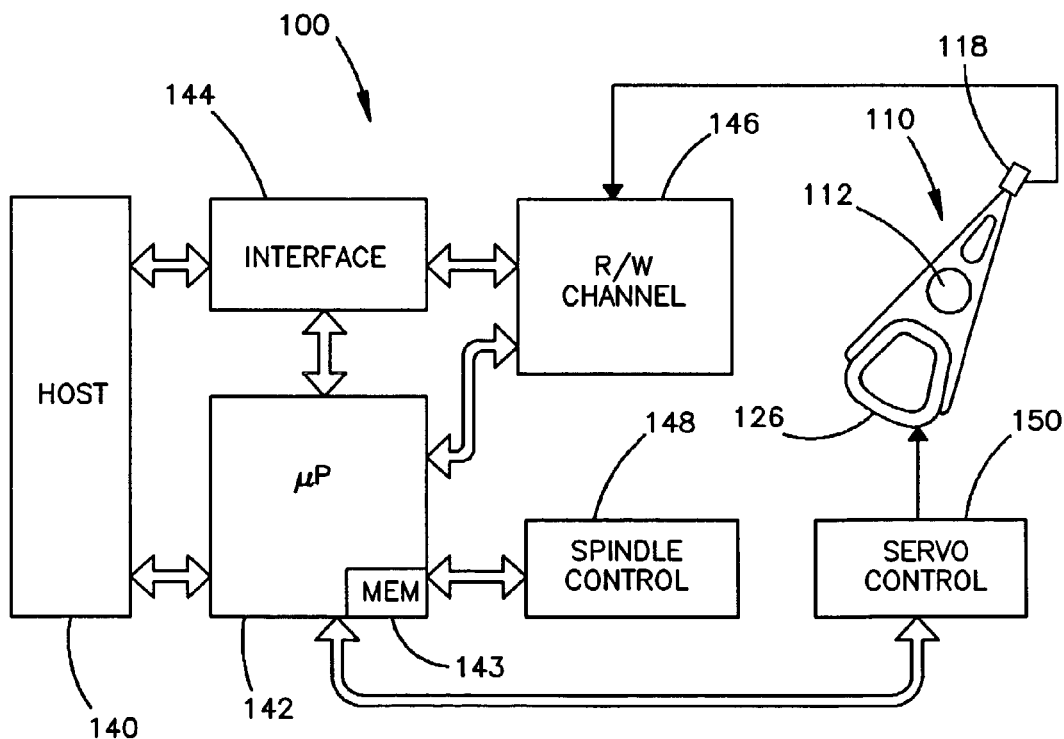
FIG. 2 is a block diagram of the servo control system of the disc drive shown in FIG. 1 in accordance with a preferred embodiment of the present invention.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high-speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the disc drive 100, read signals are generated by the heads 118 and provided to the read/write channel 146, which performs decoding and error detection and correction operations and outputs the retrieved data to the interface 144 for subsequent transfer to the host computer 140 or other device. Such operations of the disc drive 100 are well known in the art and are discussed, for example, in U.S. Pat. No. 5,276,662 issued Jan. 4, 1994 to Shaver et al.

During the manufacturing process, after the disc drive 100 is fully assembled, the drive is placed in a test fixture. The drive is energized in accordance with a predetermined sequence of operations and the structural response of the drive is measured. The rangeless servo notch optimization (RSNO) routine is then performed on the disc drive as will be more fully explained below.

Figure 3:
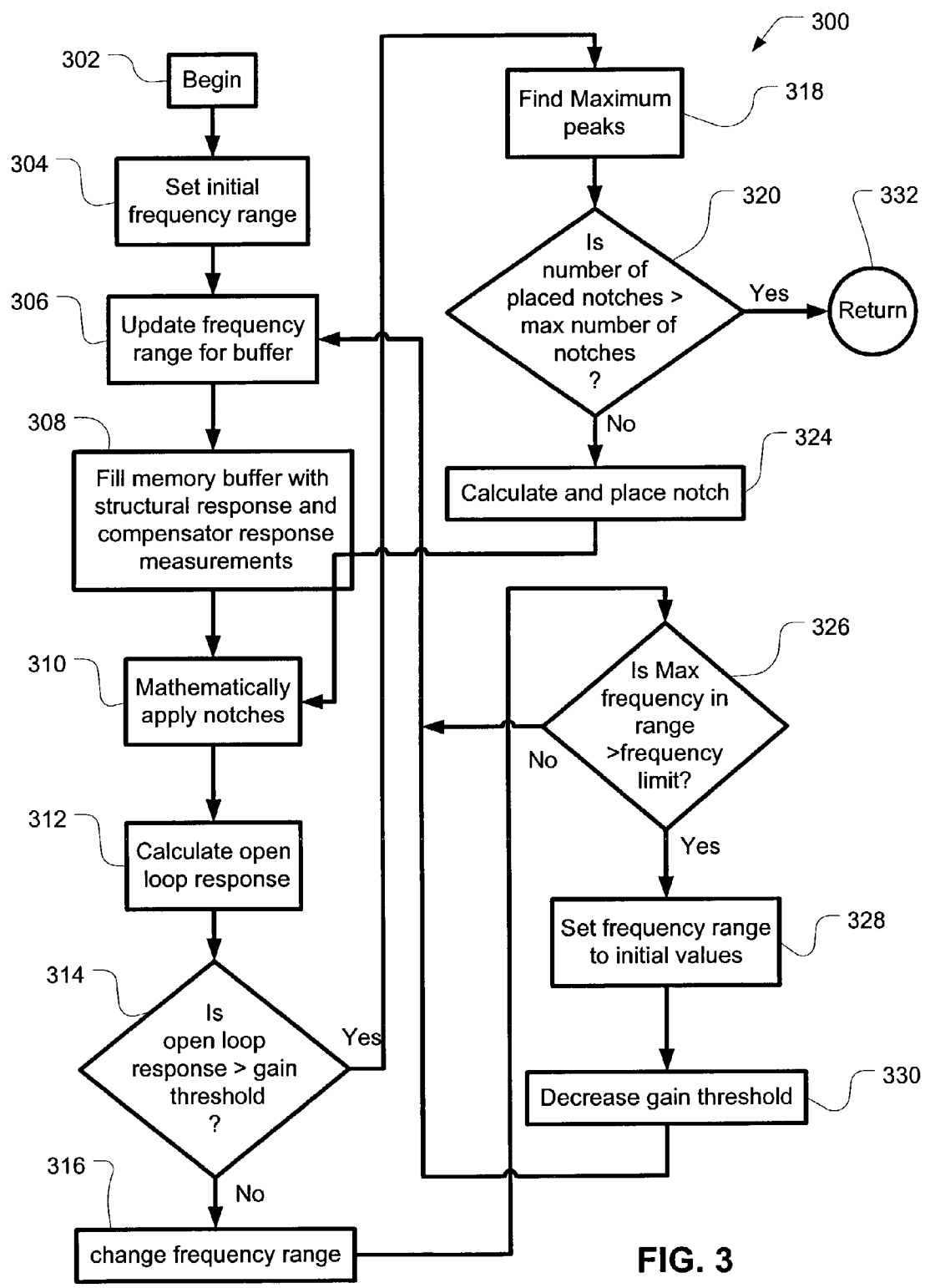
FIG. 3 is an operational flow chart of the optimization process in accordance with a preferred embodiment of the present invention.

The operational steps of the RSNO process in accordance with the invention are shown in FIG. 3. The SNO process begins in operation 302 where a structural frequency response for a drive 100 under test is measured. Control then transfers to operation 304, where the initial frequency sub-range for the operating disc drive is set. The sub-ranges are set based on the capacity of the memory buffer of the test equipment being utilized for the RSNO process. If the memory buffer is large enough, only one range may be needed. However, typically, several sub-ranges must be used to adequately cover the structural response spectrum of the drive 100. It should also be noted here that the number of available notches that can be utilized is a compromise. Each notch essentially leaches phase margin and thus the more notches one chooses to use, the more phase margin that is lost. If too much phase margin is lost, the drive system response becomes unstable. Thus too many notches lead to an unstable drive.

Once the initial sub-range is established, control transfers to operation 306. In operation 306, the frequency range for the buffer is updated. As this is the first time through the sequence of operations, the update is simply the initial frequency range set in operation 304. Control then transfers to operation 308.

Operation 308 fills the memory buffer with the structural response spectra and compensator response spectra that will be evaluated. Once again, the size of the memory buffer depends on the availability of memory in the factory test equipment and is typically on the order of 200-500 kilobytes, which is adequate to store the response measured in the frequency range set in operation 304 and 306. Control then transfers to operation 310.

In operation 310, the notch algorithm is utilized to mathematically apply the notches that have been determined in the previous operations. As this is the first time through, no notches are applied. Control then transfers to operation 312 where the open loop response for the content of the memory buffer, with notches applied, if any, is determined. Again, during this first pass, the open loop response will have no notches applied. Control then passes to query operation 314.

Query operation 314 examines the open loop response just calculated and determines whether any portion of the open loop response exceeds a gain threshold. As this is the first time through, the gain threshold is set to a relatively high preset value. If the answer to query operation 314 is yes, control passes to operation 318 in which the maximum peaks are identified. On the other hand, if the answer is no, control passes to operation 316 and the frequency range for the buffer is changed. In this instance, control then passes back to operation 306 where a new frequency range is set for the buffer, and operations 308-314 are repeated.

However, since again, this is the first time through the sequence, the answer in query operation 314 will be yes, thus control passes through operation 318 where the maximum peaks are identified and then to query operation 320. Here the question is asked whether the number of notches already placed is equal to or exceeds the maximum number of notches permitted. This maximum is determined based on the sensitivity of the drive control system and the acceptable minimum phase margin that can be tolerated. If the maximum number has been reached, control passes to Return 332 and the process is complete. As this is the first time through, though, no notches have been placed, and thus the answer to query operation 320 is no, and control passes to operation 324.

Operation 324 calculates the notch filter parameter or parameters that are used to mathematically arrive at the notch frequency and this notch is placed in the servo control system. Control then passes to operation 310, where the notch calculated is mathematically applied. Operations 312 and 314, 318 and 320 are then repeated until there are no more notches to be placed, i.e. the open loop response is less that the gain threshold in operation 314. Control then transfers to operation 316, the frequency range is changed, and control moves to query operation 326.

Query operation 326 asks the question whether the maximum frequency in the new range is greater than the predetermined upper frequency limit of the drive. If it is, then the frequency range is reset back to the initial frequency range in operation 328, the gain threshold is reset to a lower value in operation 330, and control transfers back to operation 306 where the frequency range for the buffer is again updated. On the other hand, if the maximum frequency in the new range is less that the upper frequency limit of the drive, control transfers directly back to operation 306 without lowering the gain threshold and operational steps 306 through 324 are repeated as many times as needed to place all the notches in this sub-range.

When the response to query operation 314 is again no, and the frequency range is changed again in operation 316, control returns to operation 326 etcetera until either all peaks have been notched or there are no more notches. In reality, not all peaks will be notched, as the gain threshold keeps getting reduced with each cyclic iteration sequence, and thus all available notches will in fact be used, and control will transfer to operation 332 and return to main testing control, thus completing the RSNO process for the drive under test.

Figure 4:
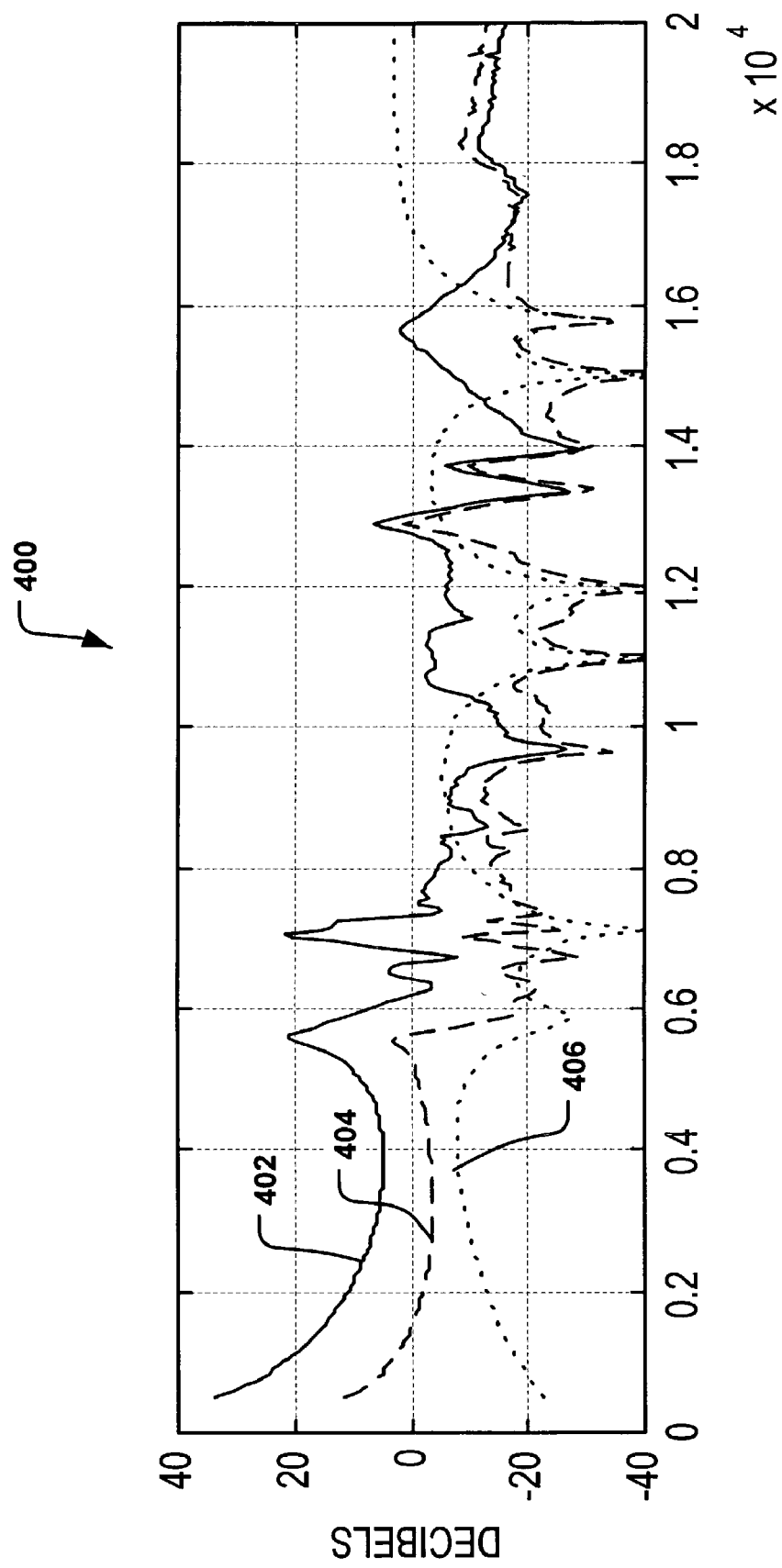
FIG. 4 is a bode plot of a disc drive with conventional servo notch placement.
Figure 5:
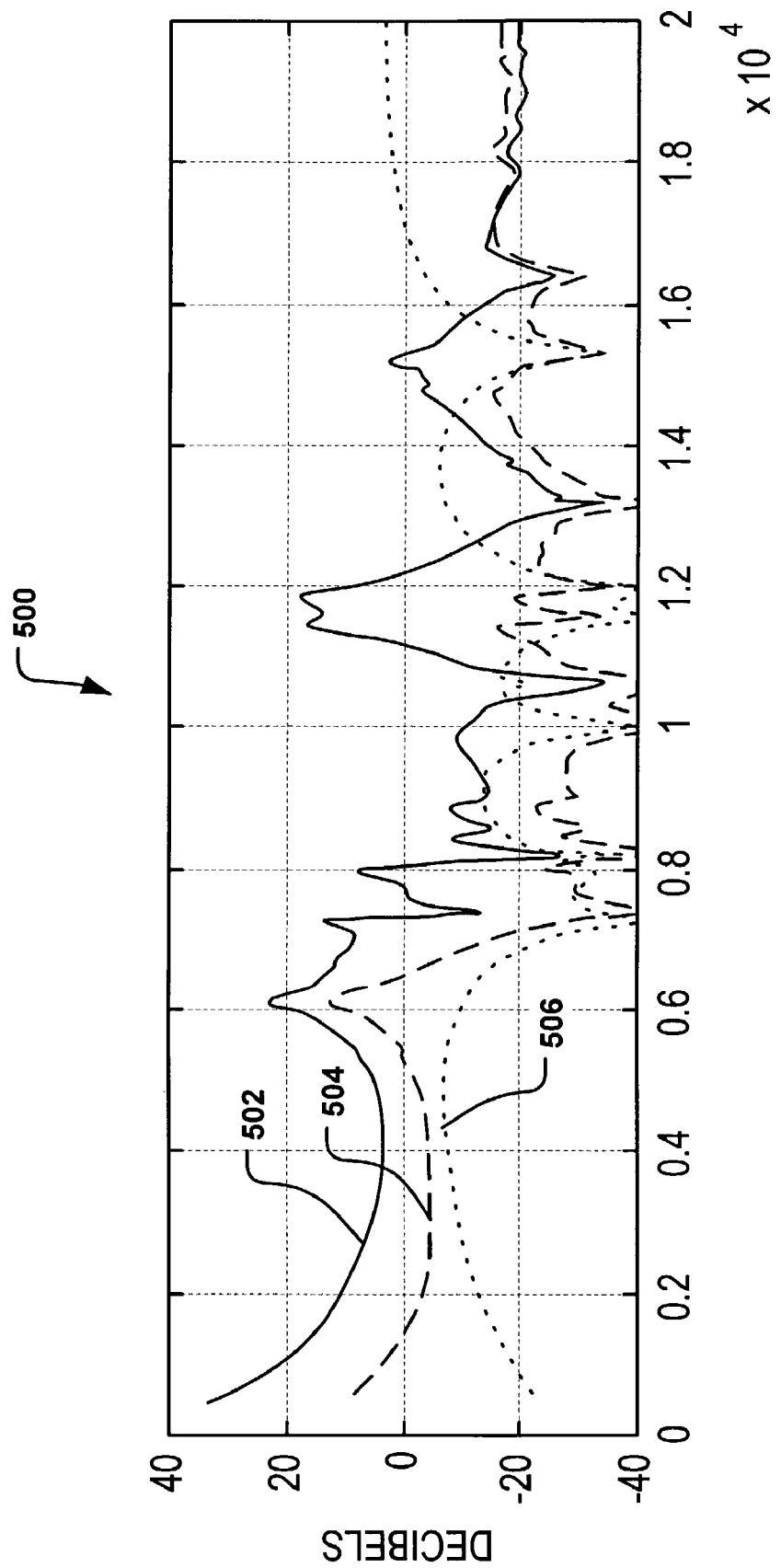
FIG. 5 is a bode plot of a disc drive response with servo notch placement performed in accordance with a preferred embodiment the present invention.

The impact of utilizing the notch placement scheme in accordance with the present invention is illustrated clearly by comparing the Bode plots shown in FIGS. 4 and 5. A disc drive Bode plot 400 for a disc drive in which the notch filters were placed in accordance with a conventional SNO placement scheme is shown in FIG. 4. In this case, the solid line 402 represents the structural response of the disc drive in a frequency range of 0 to 20,000 hertz (Hz). The dashed trace line 404 represents the open loop response. The dotted line 406 represents the compensator response with all notches placed. The dips in the dotted trace 406 indicate the placement of the notch filters. In this case, a notch filter is placed at about 5900 Hz, 7100 Hz, 11,000 Hz, 12,000 Hz, 15,000 Hz, and 15,800 Hz. The filter placed at 5900 Hz compensates for a peak at about 5700 Hz. The filter placed at 7100 compensates for a peak at the same frequency. The filter placed at 11000 is essentially between double peaks at about 10700 and 11200. The filter at 12000 is off peak. The next filter isn't until 15000 and thus misses entirely the peaks at 13000 and 13800.

In contrast, a Bode plot 500 for a disc drive having notch filters placed in accordance with the present invention shows that the filters are relatively accurately placed about the peaks. Again, the solid line trace 502 represents the raw structural response. The dashed line trace 504 represents the open loop response. The dotted line trace 506 represents the compensator response with all notch filters placed per the method described above with reference to FIG. 3. The structural response has a peak at 6000, 7100, 8000, 10000, a double peak at 11400 and 11800, and a peak at 15200. Note that the filters are placed at 7100, 8000, 10000, 11400 and 11800, and at 15200 Hz. The filter placement corresponds almost exactly with the structural response peaks. Thus the filter placement is more in line with the actual peaks than in the conventional scheme. Further, the double peaks are accurately filtered, which will result in fewer failed drives.

In summary, the method in accordance with the present invention may be viewed as a method (such as 300) for placing notch filters in a servo control loop (such as 150) in a disc drive (such as 100) that includes steps of:

(a) measuring a structural response for the drive (such as in operation 302);

(b) calculating an open loop response for the structural response (such as on operations 304-312);

(c) determining a frequency peak (such as are shown in trace 504) in the open loop response (such as in operation 314 and 318);

(d) calculating a notch filter for the frequency peak (such as are shown in trace 504 in operation 324); and e) placing the notch filter in the control loop (such as in operation 310);

f) recalculating the open loop response (such as in operation 312);

g) repeating steps c through g (such as in operations 310, 312, 314, 318, 320, and 324) until no frequency peaks are determined (such as in operation 314) and h) changing the gain threshold (such as in operation 330) if no peaks are determined (such as in operation 314), and then repeating steps (c) through (h) (such as in operations 306 through 324) until a maximum number of notches has been placed in the control loop.

The determining step (c) preferably includes comparing the open loop response to a gain threshold (such as in operation 314) and selecting a peak that exceeds the threshold (such as in operation 318). Further, if no peaks exceed the threshold (such as in operation 314), then the threshold is changed (such as in operation 316) and the comparing and selecting steps (such as 306 through 324) are preferably repeated. Generally there are a predetermined number of notch filters and steps (a) through (g) above are repeated until the predetermined notch filters are all placed in the control loop (such as in operation 320).

Alternatively, the present invention may be viewed as a disc drive servo control system test system for setting notch filters in the servo control system control loop of a disc drive (such as 100). The test system includes a memory and means (such as operational sequence 300) for detecting resonance peaks (such as in traces 502 and 504) in a disc drive open loop response spectrum stored in the memory and dynamically setting a notch filter in the servo control system for each resonance peak, preferably sequentially in order of maximum amplitudes. The detecting means comprises means for measuring a structural response of a disc drive (such as in operation 302) and storing the response in the memory (such as in operations 304 and 306) and means for calculating the open loop response for the structural response stored in the memory (such as in operation 312). The test system preferably also includes means for determining one of the resonance peaks in the open loop response (such as in operation 318), means for calculating a notch filter for the peak (such as in operation 324), and means for placing the notch filter in the control loop (such as in operation 310). More preferably, the system also has means for recalculating the open loop response with the notch filter in the control loop and determining another peak, calculating another notch filter for the another peak and placing the another notch filter in the control loop and repeating the determining, calculating and placing (such as in operations 314, 318, 320, 324, 310, and 312) until no additional peaks are determined.

The means for determining preferably includes a gain threshold to which the open loop response is compared to identify the resonance peaks (such as in operation 314).

Alternatively, the disc drive servo control system test system for setting notch filters in the servo control system control loop of a disc drive (such as 100) includes a memory module, a resonance detection module for detecting resonance peaks in a disc drive open loop response spectrum stored in the memory, and a dynamic notch filter module for dynamically setting a notch filter in the servo control system for each resonance peak that exceeds a predetermined threshold amplitude in the open loop response. The resonance detection module comprises a measuring module for measuring a structural response of a disc drive and storing the response in the memory module, and a calculation module for calculating the open loop response for the structural response stored in the memory. The test system also preferably has an identification module for determining one of the resonance peaks in the open loop response, a filter calculation module for calculating a notch filter for the peak, and a placement module for placing the notch filter in the control loop.

More particularly, the method of the present invention may be viewed as a method for placing a predetermined number of notch filters in a data storage device servo control system comprising steps of:
 a) selecting a predetermined frequency range (such as in operations 304 and 306);
 b) storing a response spectrum of noise generated by the data storage device in the predetermined frequency range in a memory (such as in operation 308);
 c) calculating an open loop response for the response spectrum (such as in operation 312);
 d) determining whether any noise frequencies in the open loop response exceed a selected gain threshold (such as in operation 314);
 e) if there are any noise frequencies that exceed the gain threshold, calculating a notch filter for each noise frequency (such as in operations 318, 320 and 324);
 f) mathematically applying the notch filter into the servo control system (such as in operation 310);
 g) repeating steps (c)-(g) until no noise frequencies exceed the gain threshold;
 h) selecting another frequency range (such as in operation 316);
 i) if the another frequency range is less than a maximum range (such as in operation 326), repeating steps (c) through (i) (such as in operations 306 through 314);
 j) reducing the gain threshold (such as in operations 326-330); and
 k) repeating steps (c)-(j) until the predetermined number of notch filters have been placed (such as in operations 320 and 332).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, Numerous other changes may be made which will readily suggest themselves to those skilled in the art and which are encompassed in the spirit of the invention disclosed and as defined in the appended claims.

What is claimed is:

1. A method for placing notch filters in a servo control loop in a disc drive comprising steps of:
 a) measuring a structural response for the drive;
 b) calculating an open loop response for the structural response;
 c) determining a frequency peak in the open loop response;
 d) calculating a notch filter for the frequency peak;
 e) placing the notch filter in the control loop;
 f) recalculating the open loop response;
 g) repeating steps (c) through (g) until no frequency peaks are determined; and
 h) changing a gain threshold if no peaks are determined, and repeating steps (c) through (g) until a maximum number of notches have been placed in the control loop.

2. The method according to claim 1 wherein the determining step (c) comprises steps of:
 (c)(i) comparing the open loop response to the gain threshold; and
 (c)(ii) selecting a peak that exceeds the threshold.

3. The method according to claim 2 further comprising a step of:
 (c)(iii) if no peaks exceed the threshold, then changing the threshold and repeating steps (c)(i) and (c)(ii).

4. The method according to claim 1 wherein there are a predetermined number of notch filters and steps (a) through (h) are repeated until the predetermined number of notch filters are placed in the control loop.

5. A test system for setting notch filters in the servo control system control loop of a data storage device, the test system comprising:
 a memory; and
 means for detecting resonance peaks in a data storage device open loop response spectrum stored in the memory and dynamically setting a notch filter in the servo control system for each resonance peak sequentially in order of resonance magnitude.

6. The test system according to claim 5 wherein the detecting means comprises:
 means for measuring a structural response of a data storage device and storing the response in the memory; and
 means for calculating the open loop response for the structural response stored in the memory.

7. The test system according to claim 6 further comprising:
 means for determining a maximum one of the resonance peaks in the open loop response;
 means for calculating a notch filter for the peak; and
 means for placing the calculated notch filter in the control loop.

8. The test system according to claim 7 further comprising:
 means for recalculating the open loop response with the notch filter in the control loop and determining another maximum peak, calculating another notch filter for the another peak and placing the another notch filter in the control loop and repeating the determining, calculating and placing until no additional peaks are determined.

9. The test system according to claim 8, wherein the means for determining includes an adjustable gain threshold to which the open loop response is compared to identify the resonance peaks, and wherein the threshold is iteratively reduced in order to sequentially identify maximum peaks.

10. A disc drive servo control system test system for setting notch filters in the servo control system control loop of disc drive, the test system comprising:
- a memory module;
- a resonance detection module for detecting resonance peaks in a disc drive open loop response spectrum stored in the memory; and
- a dynamic notch filter module for dynamically setting a notch filter in the servo control system for each resonance peak that exceeds a predetermined threshold amplitude in the open loop response in order of resonance peak amplitude.

11. The test system according to claim 10 wherein the resonance detection module comprises:
- a measuring module for measuring a structural response of a disc drive and storing the response in the memory module; and
- a calculation module for calculating the open loop response for the structural response stored in the memory.

12. The test system according to claim 11 further comprising:
- an identification module for determining a maximum one of the resonance peaks in the open loop response;
- a filter calculation module for calculating a notch filter for the peak; and
- a placement module for placing the notch filter in the control loop.

13. A method for placing a predetermined number of notch filters in a data storage device servo control system comprising steps of:
- a) selecting a predetermined frequency range;
- b) storing a response spectrum of noise generated by the data storage device in the predetermined frequency range in a memory;
- c) calculating an open loop response for the response spectrum;
- d) determining whether any noise frequencies in the open loop response exceed a selected gain threshold;
- e) if there are any noise frequencies that exceed the gain threshold, calculating a notch filter for each noise frequency;
- f) mathematically applying the notch filter into the servo control system;
- g) repeating steps (c)-(g) until no noise frequencies exceed the gain threshold;
- h) select another frequency range;
- i) if another frequency range is less than a maximum range, repeat steps (c) through (i);
- j) reduce the gain threshold; and
- k) repeat steps (c)-(j) until the predetermined number of notch filters have been placed.

14. A system comprising:
- a memory to store information relating to a frequency response of a channel, the channel having the frequency response across a frequency range; and
- a processor to generate a compensation filter for the channel by:
  - (a) storing frequency response information for a portion of the frequency range into the memory;
  - (b) setting an adjustable amplitude threshold for frequencies within the portion of the frequency range;
  - (c) identifying frequencies at which an open loop response associated with the channel has an amplitude peak that exceeds the set amplitude threshold within the portion of the frequency range; and
  - (d) applying a compensation filter comprising one or more notch filters to substantially attenuate the amplitude peak at each of the identified frequencies.

15. The system of claim 14, further comprising:
- (e) repeating the operations (a)-(d) for different portions of the frequency range until the compensation filter includes a maximum number of notch filters or until the entire frequency range has been compensated.

16. The system of claim 15, wherein the maximum number of notch filters is a function of a phase margin specification.

17. The system of claim 15, further comprising:
- (f) repeating the operations (a)-(e) at a reduced amplitude threshold until the compensation filter includes a maximum number of notch filters or until the entire frequency range has been compensated.

18. The system of claim 14, wherein each portion of the frequency range has a frequency span, the memory has a size, and the frequency span of each portion of the frequency range is a function of the size of the memory.

19. The system of claim 14, wherein the channel comprises an electrical signal path in a control system.

20. A method to generate a compensation filter for a channel, the method comprising:
- (a) providing a channel with a frequency response across a frequency range;
- (b) storing frequency response information for a portion of the frequency range;
- (c) setting an adjustable amplitude threshold for frequencies within the portion of the frequency range;
- (d) identifying frequencies at which an open loop response associated with the channel has an amplitude peak that exceeds the set amplitude threshold within the portion of the frequency range; and
- (e) applying a compensation filter comprising one or more notch filters to substantially attenuate the amplitude peak at each of the identified frequencies.

* * * * *